United States Patent [19]
French et al.

[11] Patent Number: 5,909,832
[45] Date of Patent: Jun. 8, 1999

[54] VEHICLE CLEANING KIT

[76] Inventors: Roland C. A. French; Cyril L. A. French, both of 91-1361 30th Street S.E., Salmon Arm, British Columbia, Canada, V1E 2P2

[21] Appl. No.: 09/086,254

[22] Filed: May 28, 1998

[51] Int. Cl.[6] .................................................. B60R 7/00
[52] U.S. Cl. ........................... 224/547; 206/223; 206/229
[58] Field of Search .................................... 206/223, 225, 206/226, 229; 224/545, 547, 555, 567; 248/222.14

[56] References Cited

U.S. PATENT DOCUMENTS

| | | | |
|---|---|---|---|
| 2,990,944 | 7/1961 | Bombarger et al. | 206/229 |
| 4,516,676 | 5/1985 | Cournoyer | 206/229 |
| 4,887,713 | 12/1989 | Tupper | 206/229 |
| 5,035,321 | 7/1991 | Denton | 206/229 |
| 5,238,106 | 8/1993 | Nguyen et al. | 206/223 |
| 5,839,771 | 11/1998 | DeMars | 206/225 |

*Primary Examiner*—Jim Foster
*Attorney, Agent, or Firm*—Baker & McKenzie

[57] ABSTRACT

The invention relates to a vehicle cleaning kit which comprises a main housing, a housing lid dimensioned to cover the housing in sealing engagement proximate a perimeter thereof, a fluid container dimensioned to removably fit within the housing and a panel assembly dimensioned to removably retain a plurality of cleaning mechanisms. When the cleaning kit is secured to a vehicle in an upwardly arrangement, the cleaning kit provides a compact, integrated mechanism for storing and accessing the fluid container and the cleaning mechanisms.

14 Claims, 4 Drawing Sheets

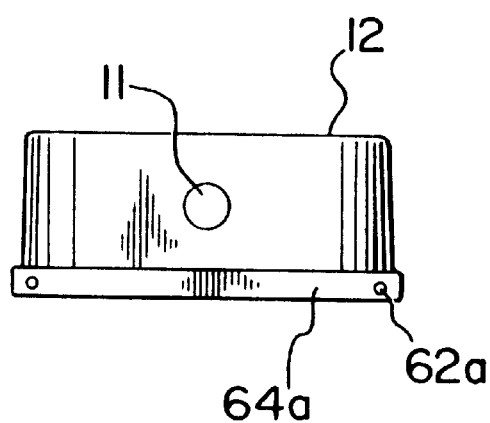
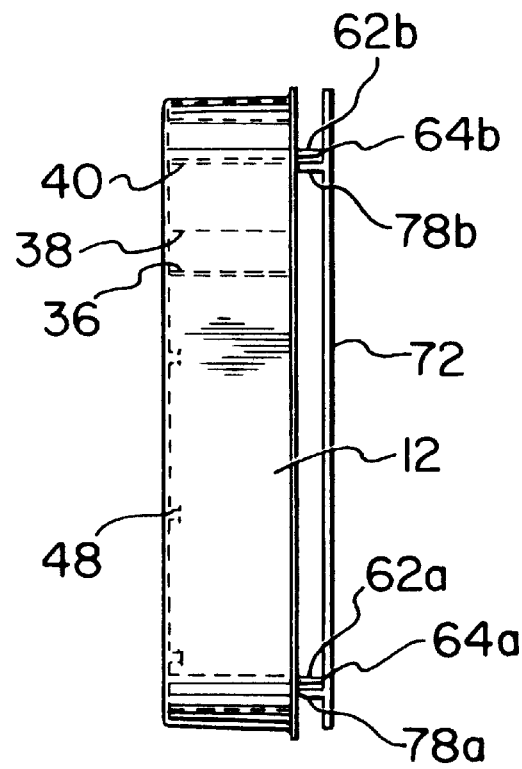
FIG. 8
FIG. 9
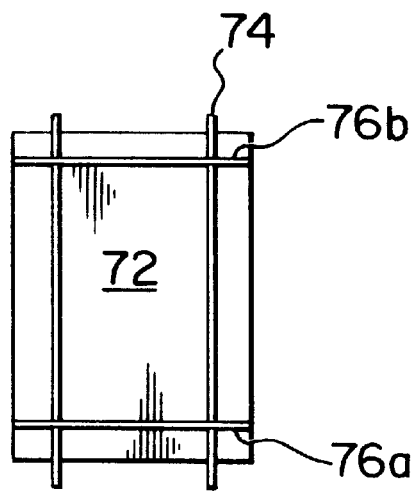
FIG. 10

VEHICLE CLEANING KIT

FIELD

The present invention relates to a cleaning kit. More particularly, the present invention relates to a compact multi-purpose cleaning kit which is mountable to a vehicle.

BACKGROUND

A wide variety of cleaning materials are commonly used by vehicle owners to clean and maintain their vehicles, including, amongst others, paper towels, windshield cleaning fluid, sponges, water buckets, spray bottles and the like. Such cleaning materials can be particularly important for certain operations, such as in long-haul trucking operations and when travelling significant distances in rural areas. In such circumstances, vehicle operators can find their visibility reduced from the accumulation of bugs and other matter on the head lights, windows, and mirrors, without any service station or the like nearby. It is not unusual, for instance, for a truck driver to have to regularly stop in uninhabited areas and clean the accumulation of insects and the like from the head lights in order to safely maintain visibility at night. Similarly, it is often necessary to clean the front grill of a vehicle to prevent accumulated matter from blocking the free flow of air around the engine block. Typically, however, cleaning materials are stored in separate locations within a vehicle resulting in wasted space. Moreover, when such cleaning materials are separately stored they can be misplaced, placing the vehicle operator in a difficult position when it is necessary to clean the vehicle headlights, grill or the like and the necessary cleaning materials are unavailable. Even where cleaning materials are available to a vehicle operator, there is typically no platform or other organizational means for organizing the cleaning materials in an easy to access arrangement.

Accordingly, it is an object of the invention to provide an improved means for storing and managing cleaning materials in a vehicle which fulfills the above needs in the art. It is a further object of the invention to provide a simple, easy to use, compact vehicle cleaning kit. It is a further object of the invention to provide an integrated vehicle cleaning kit which can be used for a plurality of cleaning functions. It is yet another object of the invention to provide a vehicle cleaning kit which has a modular structure so as to facilitate the selective arrangement of cleaning elements within the kit.

SUMMARY OF THE INVENTION

According to the invention there is provided a vehicle cleaning kit mountable to a vehicle surface for compact storage of and access to cleaning materials. The cleaning kit comprises a main housing having a sidewall and a back wall and a housing lid dimensioned to cover the housing and to substantially fit around a perimeter of the housing in sealing engagement therewith. Included with the kit there is provided a fluid container dimensioned to removably fit within the housing proximate the back wall. There is further provided means for removably retaining a plurality of cleaning components within the housing and means for mounting the housing to a vehicle with the fluid container in an upwardly arrangement. Advantageously, the vehicle cleaning kit provides a compact, integrated mechanism for storing, accessing and using cleaning materials for use in cleaning a vehicle.

In a preferable embodiment, the housing lid is sized to form a passageway between an inner surface of the lid and an outer surface of the housing side wall. In this embodiment, the housing lid can include means for discharging runoff fluid from the cleaning kit which would otherwise collect at the bottom of the kit when the housing lid is in sealing engagement with the housing.

In another embodiment, the fluid container includes a discharge pipe and means for closing and opening the discharge pipe so as to selectively retain fluid inside the container. This embodiment offers the advantage of improving the ability of a user to discharge fluid from the fluid container without having to remove the container from the housing.

In another embodiment, there is provided a retaining assembly being adapted to removably retain at least one of: (i) a cleaning brush with shaft; (ii) a spray bottle; and (iii) a squeegy. Preferably, when the kit is mounted to a vehicle, the retaining assembly arranges the above cleaning components in a substantially upwardly and compact arrangement.

The cleaning kit can include means for removably retaining a paper towel roll within said housing to further extend the functionality of the kit. In one preferable embodiment the paper towel roll is disposed within the housing above the fluid container with a spacing therebetween for access to an open end of the container. The cleaning kit may also include guide channel means for guiding a removable paper towel holder into and out of the housing.

Preferably, the cleaning kit is modular so as to permit easy access and maintenance of the housing and other component parts.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 8 is a bottom view of the main container of the vehicle cleaning kit in accordance with the present invention;

FIG. 9 is a side view of the main container of the cleaning kit in accordance with the present invention; and FIG. 10 is a front view of a mounting plate with mounting pins in accordance with the present invention.

DETAILED DESCRIPTION

Figure 1:
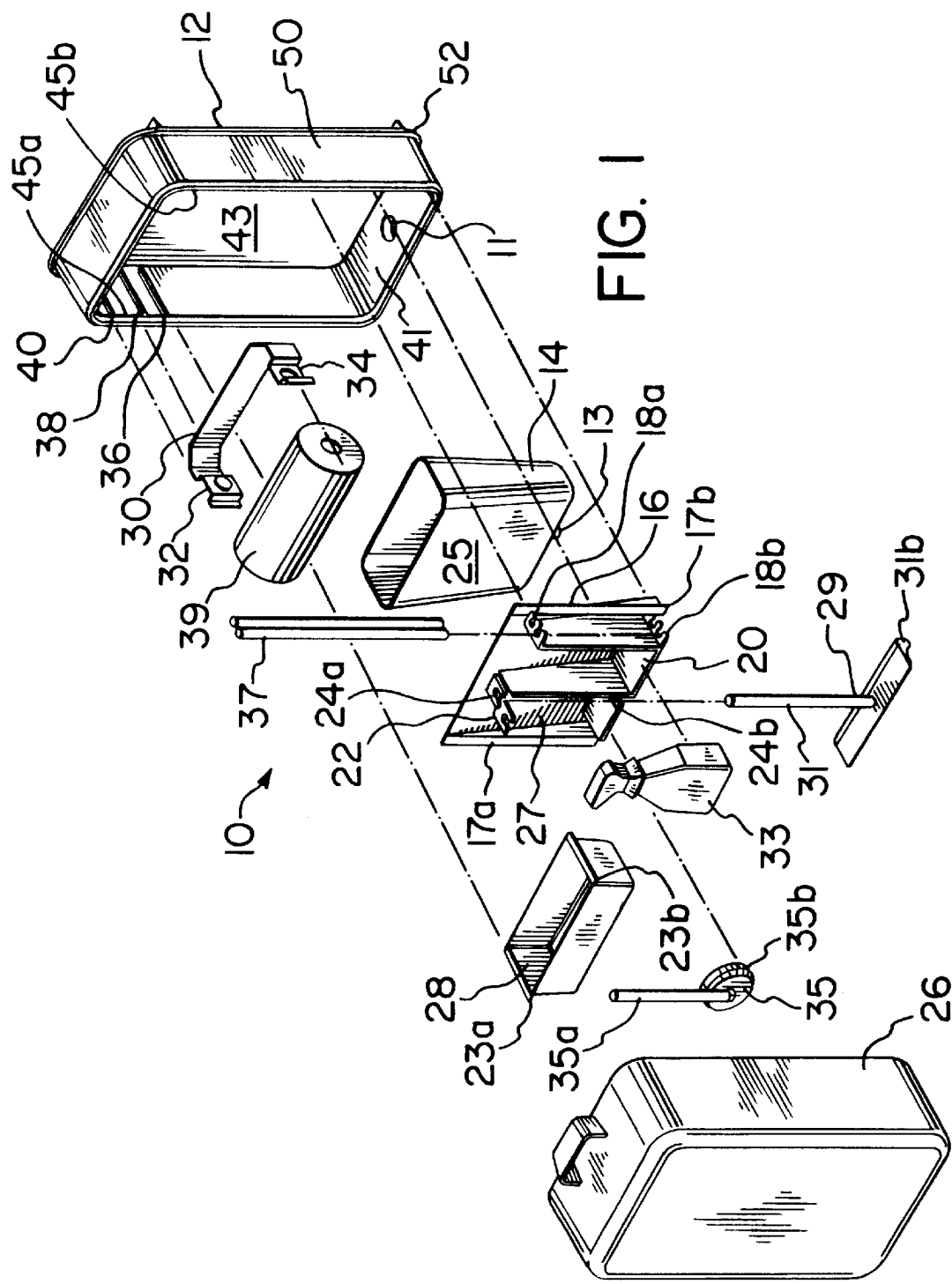
FIG. 1 is an exploded, perspective view of a vehicle cleaning kit in accordance with the present invention.

Referring to FIG. 1, vehicle cleaning kit 10 comprises a main housing 12 and housing lid 26. Housing 12 is dimensioned to receive fluid container 14, front panel assembly 16, paper towel holder 30 and auxiliary bin 28 which, in combination, enable an operator to store and use in a compact, integrated arrangement cleaning materials such as spray bottle 33, brush 35, paper towel 39, and cleaning fluid within container 14.

Figures 2, 3:
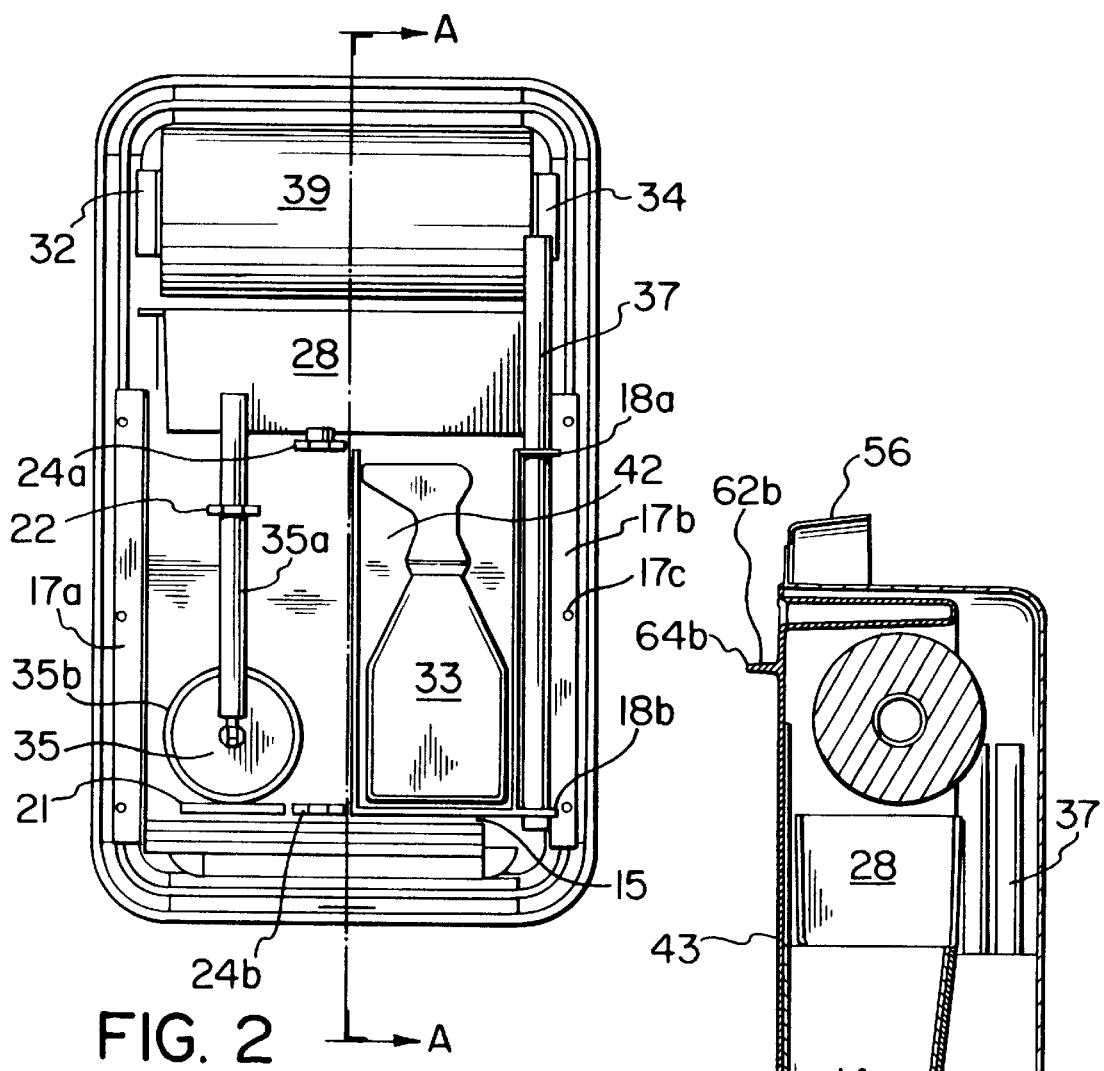
FIG. 2 is a sectional view of an embodiment of the vehicle cleaning kit in accordance with the present invention.
FIG. 3 is a sectional view of the embodiment of the cleaning kit in FIG. 2 along section lines A—A.

Referring to FIGS. 1, 2, and 3, fluid container 14 is preferably dimensioned to removably fit within main housing 12 proximate back wall 43 and lower wall 41 so as to make the remaining space within housing 12 readily available for additional elements. In a particularly preferred embodiment, fluid container 14 includes drain pipe 13 and lower wall 41 defines aperture 11 sized to snugly receive drain pipe 13. Drain pipe 13 serves as a sealable opening enabling the user to drain fluid from fluid container 14 without having to remove container 14 from housing 12. As illustrated in FIG. 3, drain plug 54 is used to preferably close drainage pipe 13.

Referring to FIGS. 1 and 2, paper towel holder 30 is shown located above fluid container 14. Paper towel holder preferably comprises a substantially continuous frame including opposing releasable roller ends 32 and 34 which resiliently engage to the roller ends of paper towel 39. In the embodiment illustrated in FIG. 1, towel holder 30 is dimensioned to snugly and removably fit within housing 12 along guide channels 38 and 40 each of which extend susbtantially inwardly into housing 12 from opposing sides 45a and 45b. Advantageously, the removable fitting of towel holder 30 within housing 12 allows for ease of mounting and removing paper towel 39 and for ease in cleaning and maintaining the cleaning kit 10. Paper towel holder 30 is preferably dimensioned so that when mounted along guide channels 38 and 40, holder 30 will retain a roll of paper towel between ends 32 and 34 for subsequent use.

Front panel assembly 16 is mounted within housing 12 in front of and in substantially abutting arrangement with fluid container 14. Panel assembly 16 includes compartment 20 dimensioned to receive spray bottle 33 in an upwardly arrangement. Retaining clips 24a and 24b extend outwardly from assembly 16 in substantially parallel alignment and are operative to removably retain handle 31 of window wiper/squeegy 29 such that wiper 29 can be readily clipped to assembly 16 in compact arrangement with cleaning end 31b located proximate an underportion 15 of panel assembly 16. Panel assembly 16 further includes retaining clip 22 for removably retaining brush 35 by its shaft 35a and retaining clips 18a and 18b for removably retaining extension shafts 37 which, in operation, can be coupled end-to-end to the shaft of brush 35 or window wiper 29 for improved reach and range of use when cleaning. A seat 21 extends from a lower portion of assembly 16 upon which brush 35 can rest. Preferably, brush 35 includes a shaft and a brush pad 35b pivotally mounted to a distal end of the shaft 35a. In this compact arrangement, brush 35 is adapted to be removably retained by retaining clip 22 with brush pad 35b substantially parallel with the shaft 35a. Moreover, the substantially circular perimeter of brush pad 35b and the pivotal relationship of pad 35b with shaft 35a have the advantage of improving the ability of a user to clean the rounded surfaces of headlights with brush 35. Additionally, assembly 16 can include a clip (not shown) similar to clip 22 but sized to removably clip to the neck of spray bottle 33 so as to secure the same to assembly 16.

In the embodiment illustrated in FIGS. 1 and 3, panel assembly 16 preferably includes outer flanges 17a and 17b each having a series of holes 17c. Assembly 16 is shown mounted to housing 12 with holes 17c preferably in alignment with threaded bores 48 of housing 12 (see FIG. 9). Assembly 16 is removably coupled to housing 12 with screws or other securing means.

Referring to FIGS. 1 and 3, where fluid container 14 has an angular front wall 25, panel assembly preferably includes a back panel 27 shaped to mate with the angular front wall 25 for improved use of space. In the embodiment shown in FIG. 3, angular front wall 25 and back panel 27 are arranged at an oblique angle of about 1 to 2 degrees measured from the lower side wall 41. Typically, the oblique angle of the angular front wall 25 and back panel 27 will be in the range of about 1 degree to about 10 degrees, although this angle will vary with the selected application and desired spacing within housing 12.

Referring to FIG. 1, preferably, auxiliary bin 28 includes guide flanges 23a and 23b and can be mounted along guide channels 36 above assembly 16 and fluid container 14. Auxilliary bin 28 can serve to separately store additional cleaning materials or garbage and acts as a splash guard for fluid stored in fluid container 14.

Figure 4:
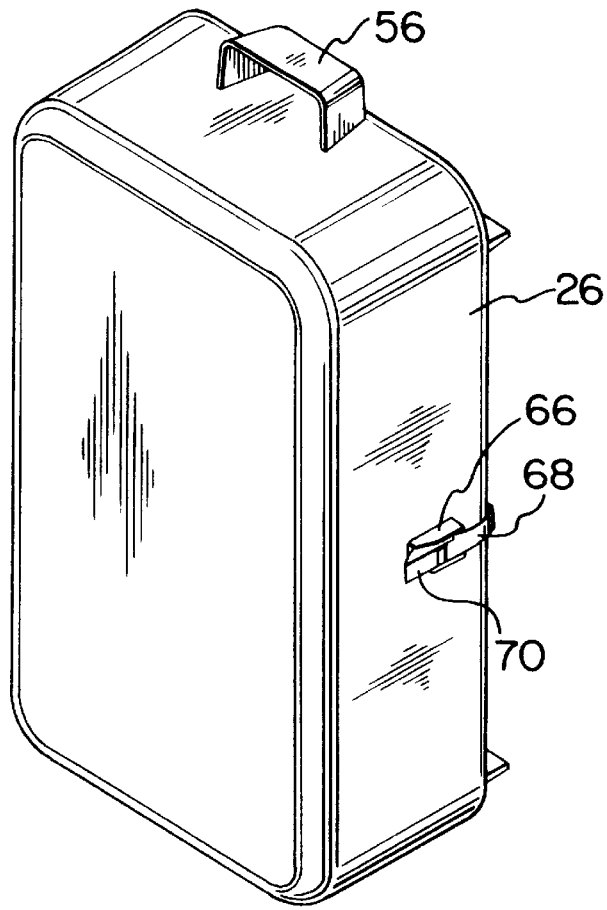
FIG. 4 is a side view of a vehicle cleaning kit lid in accordance with the present invention.
Figure 5:
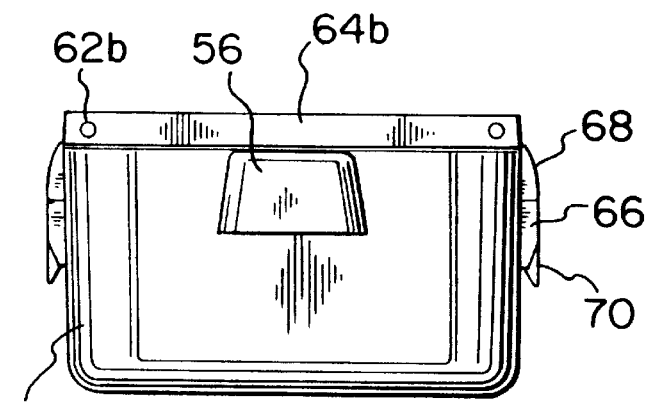
FIG. 5 is a bottom view of a vehicle cleaning kit lid in accordance with the present invention.

Referring to FIGS. 1 and 3, housing lid 26 is dimensioned to fit around substantially endless exterior side wall 50 of housing 12 in abutting engagement with perimeter 52 of housing 12. As depicted in FIGS. 4 and 5, housing lid 26 includes clasp 66 on opposing sides thereof to which housing 12 can be removably secured with strap 68 and clip 70. Alternatively, lid 26 can be secured to housing 12 with other retaining means such as screws, clips, retaining pins, or a latch mechanism. When removed from housing 12, housing lid 26 can advantageously serve as a catch basin for collecting waste fluids such as oil. Additionally, handles 56 enable a user to readily carry materials in housing lid 26 when it is removed from housing 12. Moreover, when lid 26 is snugly mounted to housing 12, cleaning kit 10 can be manually carried using handles 56. A user can carry cleaning kit 10 manually by handles 56 or, when fluid is held in container 14, by the upper one of handles 56 while avoiding spillage.

Figure 6:
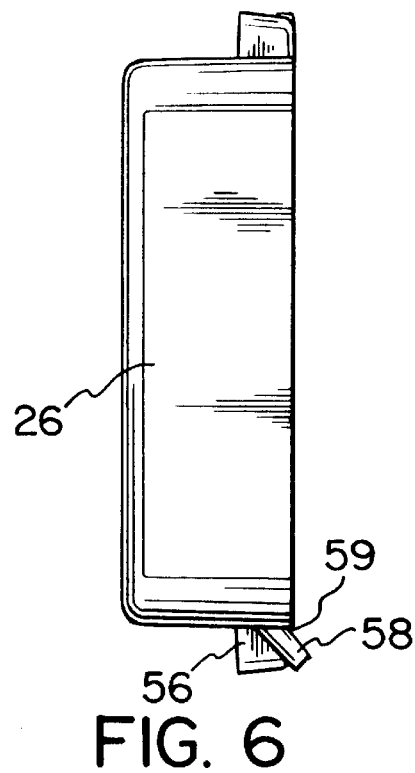
FIG. 6 is a perspective view of the vehicle cleaning kit covered by the lid and closed with a clasp.
Figure 7:
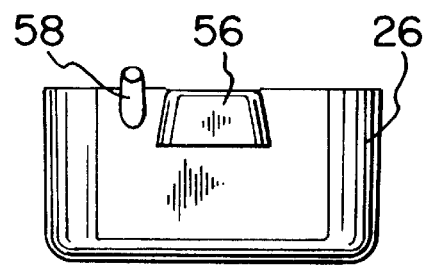
FIG. 7 is a top view of an embodiment of the cleaning kit, with the housing enclosed by the housing lid and secured thereto with retaining clasps and straps.

Referring to FIGS. 6 and 7, housing lid 26 preferably forms a passageway 53 between an inner surface of lid 26 and an outer surface of housing 12 and includes discharge spout 58 extending from end 59 so as to provide a means for drainage of fluids which may run into passageway 53 off wet components inside kit 10 after use. Advantageously, as is apparent in FIG. 3, in the event fluid inside fluid container 14 overflows due to rough travel or a leak which may arise in discharge pipe 58, fluid run off can also drain from the cleaning kit 10 out discharge spout 58. In addition, spout 58 is positioned adjacent a perhipery of side wall 26 and directed at an inclined angle to and away from a closed wall of lid 26 enabling lid 26 to be used to collect waste fluids such as radiator fluid, engine oil or the like.

Preferably, the components of vehicle cleaning kit 10 are made of molded plastic. Alternatively, metal components can be used where desired.

Referring to FIGS. 8, 9 and 10, in order to mount cleaning kit 10 to a vehicle such as a truck, a mounting plate is preferably firmly coupled to a surface of the vehicle so as to form a substantially planar and upwardly oriented surface to which housing 12 can be removably coupled. Housing 12 preferably includes mounting flanges 64a and 64b defining bores 62a and 62b dimensioned to receive mounting pins 74. Mounting plate 72 can include similarly shaped mounting flanges 76a and 76b having bores 78a and 78b. When flanges 64a and 64b of housing 12 are disposed proximate flanges 76a and 76b with bores 62a and 62b in alignment with bores 78a and 78b, mounting pins 74 can be inserted therethrough in retaining arrangement. Mounting pins 74 can then be secured in the retaining arrangement with, by way of example, securing clips or lock nuts on the threaded lower ends of mounting pins 74. By removing only one of pins 74 the entire installed cleaning kit 10 can be rotated to provide more favourable access if so desired.

Referring to FIGS. 1 and 2, in use cleaning kit 10 provides a plurality of cleaning materials in compact, ready to access arrangement. Preferably, the cleaning materials such as window wiper 29, spray bottle 33, brush 35, extension shafts 37, and paper towel 39 are arranged in kit 10 in substantially non-interfering arrangement so as to enable easy access. Where auxiliary bin 28 is included and sized to fit substantially between mounted paper roll 39 and fluid container 14, brush 35 and extension shafts 37 can be quickly detached for removal or insertion of bin 28 into and out of housing 12. It will also be appreciated that paper towel holder 30 and fluid container 14 are preferably arranged so that when auxiliary bin 28 is removed from housing 12, there is sufficient space for a user to access cleaning fluid within container 14 using squeegy 29, brush stick 35, a sponge, a paper towel or other cleaning materials.

It will further be appreciated that the modular structure of cleaning kit 10 advantageously enables a user to selectively arrange cleaning materials within the kit 10. For instance, paper towel holder 30 can be removed to provide additional space for other cleaning materials, or can be replaced with an auxiliary assembly (not shown) similar to bin 28 for separate storage means. Of further advantage, guide channels 38 and 40 enable the user to mount such a separate auxiliary assembly at selective levels within housing 12.

Although this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications and embodiments as fall within the true scope of the invention.

What is claimed is:

1. A vehicle cleaning kit comprising:
   (a) a housing having a sidewall and a back wall;
   (b) a fluid container dimensioned to removably fit within said housing proximate said back wall;
   (c) means for removably retaining a plurality of cleaning components within said housing;
   (d) a housing lid engageable with said housing and dimensioned to substantially fit around a perimeter of said housing in substantially abutting engagement therewith; and
   (e) means for mounting said housing to a vehicle with said fluid container in an upwardly arrangement.

2. A cleaning kit according to claim 1, wherein said housing lid includes means for discharging fluid from said cleaning kit when said housing lid is coupled to said housing and said cleaning kit is installed on a vehicle.

3. A cleaning kit according to claim 2, wherein said housing lid includes a discharger oriented to allow said housing lid to further collect and retain waste fluid when said housing lid is removed from said cleaning kit and lying with its closed end against a substantially horizontal surface so as to permit controlled emptying of the housing lid through the discharger after collecting the waste fluid.

4. A cleaning kit according to claim 1, wherein said fluid container includes:
   (a) an open end and a closed end, said closed end including a discharge opening; and
   (b) means for closing and opening said discharge opening so as to selectively drain and retain fluid inside said fluid container.

5. A cleaning kit according to claim 1, including a storage bin located above the open end of said fluid container, said storage bin being adapted so as to serve as a splash guard for the fluid container.

6. A cleaning kit according to claim 1, wherein said retaining means in 1(c) includes a retaining being adapted to removably retain at least one cleaning mechanism selected from: (i) a cleaning brush with a shaft; (ii) a spray bottle; and (iii) a squeegy; and
   wherein said retaining assembly retains said at least one cleaning mechanism in substantially upwardly and compact arrangement when said cleaning kit is mounted to the vehicle.

7. A cleaning kit according to claim 6, wherein said retaining means in 1(c) includes means for removably retaining a paper towel roll within said housing.

8. A cleaning kit according to claim 1, wherein said retaining means in 1(c) includes means for removably retaining a paper towel roll within said housing.

9. A cleaning kit according to claim 8, wherein said retaining means in 1(c) includes an assembly operative to removably retain a cleaning brush with shaft, a spray bottle and a squeegy in a substantially upwardly and compact arrangement when said cleaning kit is coupled to the vehicle.

10. A cleaning kit according to claim 8, wherein said means for removably retaining a paper towel roll within said housing includes a removable paper towel holder having a frame dimensioned to fit within said housing and to retain a paper towel roll.

11. A cleaning kit according to claim 10, including guide channel means for guiding said removable paper towel holder into said housing in a predetermined arrangement.

12. A cleaning kit according to claim 1, including a brush comprising a shaft and a brush pad, said brush pad pivotally mounted to a distal end of the shaft, said brush being adapted to be removably retained by said retaining means in 1(c) in a retaining position; wherein said brush pad is substantially parallel with the shaft in said retaining position.

13. A cleaning kit according to claim 1, wherein said mounting means includes:
   (a) a plurality of mounting pins;
   (b) a plurality of housing flanges extending outwardly from the back wall of said housing and each defining a plurality of first bores dimensioned to receive said mounting pins;
   (c) a mounting plate couplable to a vehicle surface and having a plurality of mounting flanges each defining a plurality of second bores dimensioned to receive said mounting pins and being adapted so as to substantially align with said first bores in a predetermined arrangement; and
   (d) means for securing said mounting pins to said mounting flanges and said housing flanges when said first and second bores are in substantial alignment.

14. A vehicle cleaning kit comprising:
(a) a housing having a substantially endless sidewall, a back wall and upper and lower ends;
(b) a fluid container dimensioned to removably fit within said housing proximate said back wall, said fluid container having an open end, a closed end and a drain pipe proximate said closed end;
(c) a panel assembly removably coupled to said housing and being adapted to removably retain at least one of:
   (i) a cleaning brush with a shaft; (ii) a spray bottle; and (iii) a squeegy;
(d) a housing lid dimensioned to cover said housing and to substantially fit around a perimeter of said housing in abutting engagement therewith; and
(e) means for mounting said housing to a vehicle with said fluid container in said upwardly arrangement.

* * * * *